United States Patent [19]

Natori

[11] 4,085,577

[45] Apr. 25, 1978

[54] ELECTRONIC TIMEPIECE

[75] Inventor: Minoru Natori, Tokyo, Japan

[73] Assignee: Citizen Watch Co. Ltd., Tokyo, Japan

[21] Appl. No.: 701,655

[22] Filed: Jul. 1, 1976

[30] Foreign Application Priority Data

Jul. 2, 1975 Japan ................................ 50-81573

[51] Int. Cl.$^2$ .......................... G04C 3/00; G05B 5/01

[52] U.S. Cl. .................................. 58/23 D; 318/311; 318/318; 318/432

[58] Field of Search ............... 318/138, 180, 439, 696, 318/685, 432, 434, 310, 311, 315, 318, 139, 440; 58/23 BA, 23 D, 23 AD

[56] References Cited

U.S. PATENT DOCUMENTS

| | | | |
|---|---|---|---|
| 3,110,853 | 11/1963 | Jones | 318/318 |
| 3,546,553 | 12/1970 | Loyd | 318/318 |
| 3,756,014 | 9/1973 | Zatsky et al. | 58/28 R |
| 3,855,781 | 12/1974 | Chihara et al. | 58/4 A |

*Primary Examiner*—Edith S. Jackmon

*Attorney, Agent, or Firm*—Sherman & Shalloway

[57] ABSTRACT

An electronic timepiece is driven by a pulse motor and includes a pulse motor driving circuit which applies frequency-divided pulses for maintaining the rotational inertia of a rotor. The revolutions of the pulse motor are detected as is the load on the motor. In addition, the revolutions of the pulse motor are periodically compared with the number of driving pulse. A second hand of the electronic timepiece is continuously rotated by the pulse motor.

5 Claims, 4 Drawing Figures

ELECTRONIC TIMEPIECE

BACKGROUND OF THE INVENTION

1. Field of the Invention

The present invention relates to an electronic timepiece driven by a pulse motor which serves as an electro-mechanical converter for continuously carrying a second hand.

2. Description of the Prior Art

In a conventional timepiece driven by a pulse motor, a comparatively high frequency signal is divided repeatedly in each of the stages of a frequency divider and a 1 second pulse is derived from the last stage in the frequency divider which is used for driving the pulse motor. The pulse motor is rotated one magnetic electrode pitch per second irrespective of the number of electrodes in the pulse motor. As a result, the second hand which is rotated by or carried by the rotor of the pulse motor is instantly to be stopped at 1 second intervals at each numeral on a dial. In other words the second hand steps every 1 second. It is not required in every day life that time be observed in 1 second intervals. However, there is a crystal oscillating type electronic timepiece capable of being correctly adjusted to less than 1 second and a crystal timepiece which is provided with a chronograph which is required to be read out in units less than 1 second. These crystal timepieces have the disadvantage that time keeping is not correctly effected by a second hand carried or indexed in 1 second increments.

Heretofore movement of the second hand was accomplished by use of a tuning fork, a sound piece and high oscillating balance wheel, etc. as an electro-mechanical converter for continuously carrying the second hand. However, precisely speaking, these converters merely subdivide intermittent movement of the second hand. Therefore, this type of approach does not effect continuous movement of the second hand. In addition, converters have the drawback that reverse rotation, fast feeding, stopping, starting, etc. of the second hand is not easily controllable.

SUMMARY OF THE INVENTION

An object of the invention is to obviate the above disdvantages in the conventional electronic timepieces driven by a pulse motor.

Another object is to provide an electronic timepiece with a pulse motor which is continuously rotated at high speed to continuously carry the second hand.

Further object of the invention is to provide an electronic timepiece in which the second hand is continuously carried wherein reverse rotation, fast and slow feeding, stopping, starting and the like of the second hand are controllable easily and precisely. These and other objects have been attained by a pulse motor driven timepiece which includes a time standard signal generator, a frequency divider connected to said time standard signal generator, a pulse motor driving circuit applied by frequency-divided pulses for keeping the rotation inertia of a rotor from said frequency divider and driving said pulse motor. The rotation number of said pulse motor is detected and a load detection means is connected with said pulse motor driving circuit for detecting the load on said pulse motor. The rotation number of said pulse motor is periodically compared with the number of driving pulses from said frequency divider. A second hand of said electronic timepiece is continuously carried by or driven by said pulse motor and precisely controllable with the aforementioned circuitry.

DETAILED DESCRIPTION OF PREFERRED EMBODIMENTS

Figure 1A:
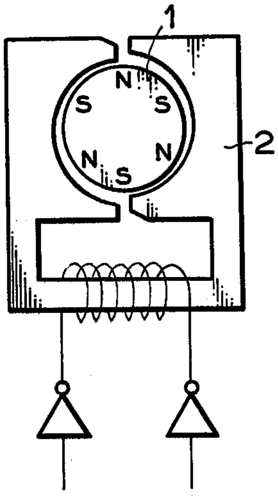
FIG. 1A PRIOR ART
FIG. 1A is an explanatory diagram showing a conventional pulse motor.
Figure 1B:
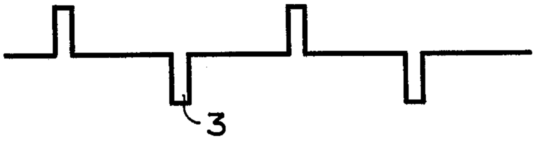
FIG. 1B PRIOR ART
FIG. 1B is a pulse wave form applied to the pulse motor shown in FIG. 1A.
Figure 1C:
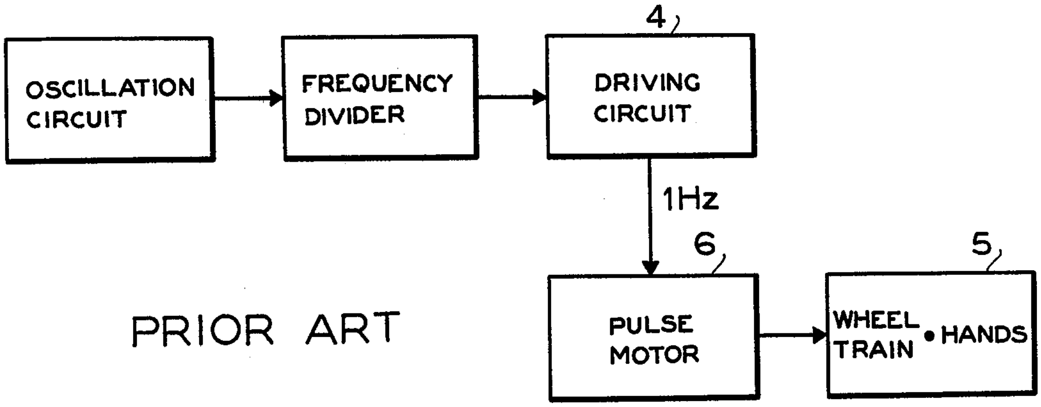
PRIOR ART FIG. 1C
FIG. 1C is a block diagram illustrating a conventional system for use in a timepiece provided with the pulse motor shown in FIG. 1A.

FIG. 1C is a block diagram of a conventional electronic timepiece utilizing a pulse motor as a converter as shown in FIG. 1A. FIG. 1B shows a pulse wave form applied to the pulse motor shown in FIG. 1A.

Figure 2:
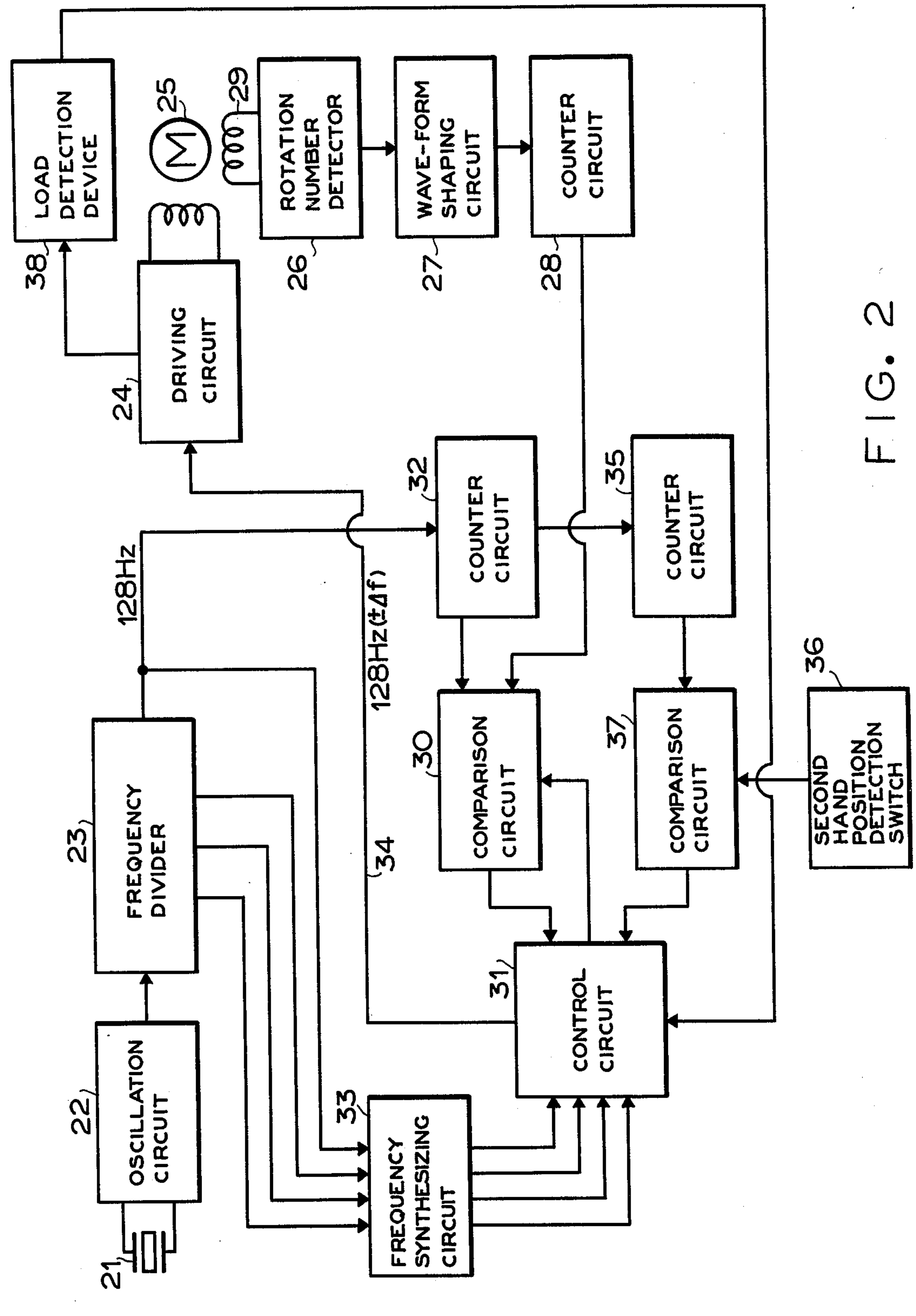
FIG. 2 is a block diagram showing one embodiment of an electronic timepiece according to this invention.

In FIG. 2, there is shown a block diagram of an electronic timepiece driven by a pulse motor according to this invention.

The pulse motor of the invention is driven by a comparatively high frequency, signal for example, 128 Hz or 256 Hz as compared with the conventional pulse motor. Therefore, the pulse motor is not rotated intermittently, but is rotated continuously. In other words, the pulse motor is rotated continuously with the rotational inertia of a rotor remaining after it has been stopped. Accordingly, it is possible to reduce the total power consumed in rotating the pulse motor during $1/n$ or several intervals of rotation per second since the power is sufficient to carry the second hand if applied by a pulse having a pulse width long enough to maintain the continuous rotation of the rotor in the pulse motor.

It is therefore advantageous in view of reducing power needed for starting and stopping the rotor that the pulse motor does not stop every step, but is rotated continuously by utilizing the power of rotational inertia of the rotor. However, there is a possibility that the rotation of the motor can become unsteady and out of synchronization because the motor is impacted with shocks that are incurred by a wrist watch.

This invention substantially eliminates the influences of impact shock and is useful to eliminate display errors.

In FIG. 2, reference numeral 21 depicts a crystal oscillation element, 22 an oscillation circuit and 23 a frequency divider.

Usually, a high frequency input is divided to produce a 1 Hz output signal by the frequency divider 23 and the 1 Hz output signal from the frequency divider is applied to a driving circuit for driving a pulse motor so that a pulse motor may be rotated as shown in FIG. 1A–1C.

On the other hand, it be required that provision is made for compensating for unsteady characteristics due to shocks against the motor 25 which is in continuous rotation by comparatively high frequency driving signal produced by a driving system according to this invention. For this purpose, a rotor rotation number detector 26 is used wherein the detected signal is changed to a pulse-shaped signal which is counted by a counter circuit 28. The counted value is, for example, a value determined each time that magnetic fluxes traverse a coil 29 from the N and S electrodes. The counted value is applied to a comparison circuit 30. If the pulse motor 25 is driven by 128 Hz signal as in this embodiment, the frequency of 128 Hz is counted by counter circuit 28 and is applied to the comparison circuit together with the counted value in the counter circuit. Both counted values are compared during each 1 second unit or interval. Then, the informaton from the comparison circuit 30 is applied to a control means or circuit 31. When the information from the comparison circuit 30 indicates no counted number in the counter circuit 28, the pulse motor 25 lags in rotation by applied pulses from the driving circuit 24. To correct for this lag, the control circuit 31 selects a frequency large enough to compensate for the lag of the pulse motor from a frequency synthesizing circuit 33 and delivers a higher frequency increased by the amount $\Delta F$ which the motor lags from the frequency. This higher frequency of 128 Hz + $\Delta F$ is applied to a line 34 connected with the driving circuit 24 so that the rotation of the motor 25 may be accelerated. Conversely if the rotation of the motor is fast, a lower frequency 128 $\Delta F$ is applied to the driving circuit. When the pulse motor is driven by the ordinary feeding of 128 Hz frequency as mentioned above, count comparison is not effected since a stop signal from the control circuit 31 is delivered to the comparison circuit 30.

In the above embodiment, the rotation number of the pulse motor is detected and adjusted every second, but it is possible to periodically detect and adjust the rotation number during periods of more than or less then 1 second.

Furthermore, in order to reduce indication errors of the second hand (not shown), a signal from the counter circuit 32 is counted by a counter circuit 35 and a second hand position detection switch 36 is associated with the second hand at a position of the second hand. For example, 0 second is detected once a minute so as to compare a switching signal with a signal from a counter circuit 35. Then, a frequency for correcting the second hand position is delivered from the control circuit 31 to the driving circuit 24, whereby a correction of more than 1 second may be effected.

Hereinbefore, when the pulse motor 25 was continuously rotated at a comparatively high frequency so as to utilize rotation inertia effectively, a frequency output from the rotation number detector 26 was compared with ordinary driven frequency and the rotation errors were adjusted every second to adjust for disturbances caused by rotation shocks and the other phenomenon in order to assure preciseness.

With a load detection means or circuit 38 inserted between the driving circuit and the control circuit 31, the load detection circuit detects a load on the pulse motor 25 in comparison with a current wave form flowing across the driving circuit or with the phase of induced voltage in a rotation detection coil 29. Thus, the load detection circuit causes the control means to modify the driving pulse width or pulse level in the driving circuit so that increased driving current may flow in order to generate a driving power larger than that of ordinary rotation when the load increases due to, for example, the pulse motor starting or due to disturbance of rotation is caused by shocks, or the like.

According to this invention, it is possible to provide an electronic timepiece provided with a pulse motor which is continuously driven by a comparatively high frequency signal in which the rotation of the pulse motor is steady. In addition, the pulse motor an electronic timepiece is driven impart by rotational inertia in order to reduce power consumption.

What is claimed is:

1. An electronic timepiece driven by a pulse motor comprising:

(1) a time standard signal generator:

(2) a frequency divider connected to said time standard signal generator;

(3) a pulse motor driving circuit applied by frequency-divided pulses for keeping the rotation inertia of a rotor from said frequency divider and driving said pulse motor;

(4) a means for detecting the rotation number of said pulse motor;

(5) a load detection means connected with said pulse motor driving circuit for detecting the load on said pulse motor;

(6) a means for periodically comparing the rotation number of said pulse motor with the number of driving pulses from said frequency divider; and (7) a control means including means for selecting the driving frequency of said pulse motor; and whereby a second hand of said electronic timepiece is continuously carried.

2. An electronic timepiece as claimed in claim 1 wherein said control means is inserted between said frequency divider and said driving circuit for selecting and delivering a frequency to adjust the rotation number of said pulse motor to said driving circuit.

3. An electronic timepiece as claimed in claim 2 wherein the number of the driving pulses and the rotation number are periodically compared with each other every 1 second or so.

4. An electronic timepiece as claimed in claim 1 wherein said control means modulates the driving current of the pulse motor in accordance with the detected signals when the pulse motor starts or its load varies.

5. An electronic timepiece as claimed in claim 1 wherein said means for detecting the rotation number of said pulse motor includes a counter circuit.

* * * * *